United States Patent
Saylor et al.

(10) Patent No.: US 6,924,005 B2
(45) Date of Patent: Aug. 2, 2005

(54) METHOD FOR THE APPLICATION OF A WATER BORNE, SPRAYABLE EROSION COATING MATERIAL

(75) Inventors: Matthew D. Saylor, Blanchester, OH (US); Timothy R. Lattire, Sunman, IN (US)

(73) Assignee: General Electric Company, Schenectady, NY (US)

( * ) Notice: Subject to any disclaimer, the term of this patent is extended or adjusted under 35 U.S.C. 154(b) by 179 days.

(21) Appl. No.: 10/353,343

(22) Filed: Jan. 29, 2003

(65) Prior Publication Data

US 2003/0134956 A1 Jul. 17, 2003

Related U.S. Application Data

(62) Division of application No. 09/658,289, filed on Sep. 8, 2000, now abandoned.
(60) Provisional application No. 60/154,628, filed on Sep. 17, 1999.

(51) Int. Cl.[7] ................................................. B05D 1/02
(52) U.S. Cl. ................................ 427/427.5; 427/427.4; 427/384; 427/388.1
(58) Field of Search ....................... 428/457; 427/427.4, 427/427.5, 384, 388.1

(56) References Cited

U.S. PATENT DOCUMENTS

| | | | | |
|---|---|---|---|---|
| 4,207,642 A | * | 6/1980 | Arato | 15/53.3 |
| 4,390,658 A | | 6/1983 | Graetz et al. | |
| 5,053,370 A | * | 10/1991 | Berneburg | 501/153 |
| 5,248,341 A | * | 9/1993 | Berry et al. | 118/698 |
| 5,326,596 A | * | 7/1994 | Kasari et al. | 204/488 |
| 5,759,932 A | * | 6/1998 | Sangeeta et al. | 501/65 |
| 5,789,083 A | | 8/1998 | Thomas | |

\* cited by examiner

*Primary Examiner*—David W. Wu
*Assistant Examiner*—Rip A. Lee
(74) *Attorney, Agent, or Firm*—V. G. Ramaswamy

(57) ABSTRACT

A sprayable protective coating for preventing excessive aircraft and aircraft engine component deterioration caused by environmental variations comprises a water borne latex-based mixture, an additive for controlling the dielectric constant of the cured coating, and a catalyst for enabling the chemical reaction between the additive, de-ionized water for thinning material and the latex-based liquid. The process for applying and curing the coating uses a robotic spraying device and an iterative heating and soaking curing procedure.

9 Claims, No Drawings

METHOD FOR THE APPLICATION OF A WATER BORNE, SPRAYABLE EROSION COATING MATERIAL

CROSS REFERENCE TO RELATED APPLICATION

This application is a division of application Ser. No. 09/658,289, filed Sep. 8, 2000 now abandoned.

This application claims the benefit of U.S. Provisional Application No. 60/154,628, filed Sep. 17, 1999.

The government has rights to this invention pursuant to Contract No. N00019-92-C-0149 awarded by the Department of the Navy.

FIELD OF THE INVENTION

The invention relates to the erosion protection of aircraft and aircraft engine components. In particular, the invention relates to an erosion resistive coating for application to inlet gas turbine engine parts and a method for applying the same.

BACKGROUND OF THE INVENTION

Components operating in the front inlet of gas turbine aircraft engines are vulnerable to the erosive effects of environmental conditions such as rain, snow and sleet. Various protection methods and protective coatings are currently being used to protect the components from these wear producing environmental variations. The most commonly used method involves applying an overlay coating to portions of the gas turbine engine in order to protect the underlying substrates. These overlay coatings typically exhibit some environmental erosion resistance and are synthetic rubber based with additives included to tailor the overlay coating to specific consumer specifications.

Application of the overlay coatings is typically accomplished by manually laying up the coating on the unprotected substrate. The manual ply lay-up method requires a cutting of the overlay coating from a premanufactured sheet of solid protective overlay coating, wherein the overlay coating is cut and fitted to near shape the component to be coated. The surface of the substrate is then prepared to receive the overlay coating by such methods as are necessary to ensure that the coating will adhere to the substrate. Once the substrate is prepared to receive the coating material, the coating material is manually placed on the substrate to be coated. The coating material is then pressure bonded onto the substrate usually by autoclave or hydraulic press. After the coating material is pressure bonded onto the substrate, the combination is finally post cured by conventional methods. The manual lay up process typically involves about ten steps to complete.

The traditional coating application method presents significant design challenges in that it is both time consuming and costly. Use of the manual ply lay-up method is time consuming in that it involves applying the protective coating to the substrate in a ten-step process done essentially by hand. The method is costly in that it requires multiple manual manipulations to complete. Consequently, the disadvantages inherent in the traditional overlay coating technique demonstrates a need for a method, which is less costly and time consuming than the manual ply lay-up coating. A suitable coating method requires less manual manipulations and involves less process steps and manpower to complete.

BRIEF SUMMARY OF THE INVENTION

The present invention provides an erosion resistive coating for aircraft and aircraft engine components and the method for applying and curing the same. In accordance with one embodiment of the invention, an erosion resistive coating mixture comprises a water borne latex-based liquid, an additive for manipulating the dielectric constant of the cured erosion resistive coating, and a catalyst for enabling the chemical reaction between the additive and the latex-based liquid. Another embodiment of the invention provides a process for applying and curing the erosion resistive coating on aircraft and aircraft engine components. The erosion resistive coating is sprayed onto the surface of the components with the use of a commercially available spray gun, such that the coating substantially completely coats the outer surface of at least a portion of the aircraft and aircraft engine substrate. The coating is dried using an iterative curing process, wherein the temperature of the substrate is increased and the substrate is soaked at predetermined temperature levels. In yet another embodiment, the present invention provides an erosion resistive coated aircraft and aircraft engine component, where the aircraft and aircraft engine component has been coated with a sprayable erosion resistive coating.

An advantage of this invention is that the invention requires less process steps to complete than does the manual ply lay-up method. The present invention is completed in three steps as opposed to the ten needed to complete the manual ply lay-up process. Consequently, the present invention is less time consuming and less costly than the traditional lay-up method.

DETAILED DESCRIPTION OF THE INVENTION

This invention is generally applicable to aircraft and aircraft engine components which are at highest risk of erosion due to the increased exposure to the erosive effects of various environmental conditions. Particularly important is the protection of those aircraft components that operate in the front of the aircraft, such as for example, front frames. These components require an increased level of erosion protection because of their location during in-flight operation of the aircraft. In one embodiment, the present invention comprises a latex-based erosion resistive coating material for use in protecting these front-end components. In particular, the latex-based coating material is preferably prepared by forming a mixture of water borne latex material, a suitable catalyst, de-ionized water and a suitable additive, wherein the additive tailors the dielectric constant of the cured coating. Any suitable additive for controlling the dielectric constant of the mixture may be used, such as, titanium dioxide or barium sulfate. By example, titanium dioxide will be illustrated, herein. Moreover, any suitable water borne latex-based liquid may be used wherein the suitable latex-based material has a mixture solid content from about 56% to 75% by weight; preferably the mixture solid content of the latex-based mixture is from about 61% to 72% by weight; and more preferably the solid content of the latex-based mixture is from about 65% to 69% by weight. A suitable water borne latex-based material, used herein by example, is Fluorolast WB (hereinafter fluorolatex) produced by the Fluorolast Corporation.

In a preferred embodiment of the coating material, a mixture of the coating material comprises a titanium dioxide to fluorolatex ratio from about 12 parts titanium dioxide to 100 parts fluorolatex; preferably, the titanium dioxide to fluorolatex ratio is from about 10 parts titanium dioxide to 100 parts fluorolatex; and more preferably the ratio is from about 8 parts titanium dioxide to 100 parts fluorolatex. In a preferred embodiment of the invention, the resulting mixture has a mixture viscosity from about 50 cp to 400 cp; preferably the viscosity is from about 60 cp to 375 cp; and more preferably the mixture viscosity is from about 70 cp to 300 cp.

The method by which the coating is applied involves the steps of preparing the gas turbine engine substrate for application of the coating, applying the coating to the substrate, and then curing the coated substrate. The substrate is prepared using conventional preparation methods well known by those skilled in the art. That is, the substrate is prepared by grit blasting the substrate, pressure washing the substrate to remove the excess grit, and then priming the substrate. The grit blasting parameters are dictated by the composition of the substrate to be blasted. For example, softer substrate surfaces, such as composite surfaces, require decreased grit size, grit blasting pressure, grit blast stand off distances, and grit blast impingement angles, than do metal substrate surfaces. In a preferred embodiment, the grit blast is set at an impingement angle of about 10 degrees to about 90 degrees. In a more preferable embodiment of this method the impingement angle of grit blast is from about 35 degrees to 90 degrees, and in an even more preferred embodiment, the impingement angle is from about 60 degrees to 90 degrees. The grit size used for grit blasting the substrate surface is dictated by the hardness and geometry of the substrate surface, wherein the grit size and the hardness of the surface have a direct relationship. That is, the softer the surface to be grit blasted, the smaller the grit size to be used. A preferred grit size is from about 60 to 100 grit, and more preferably from about 70 grit to 90 grit in size. The grit is blasted at the substrate from a stand off distance of from about 4 inches to 12 inches. More preferably, the grit is blasted from a stand off distance from about 6 inches to 10 inches. In a preferred embodiment, the grit is blasted at a pressure from about 20 pounds per square inch (psi) to 100 psi. Preferably, the grit is blasted at a pressure from about 30 psi to 80 psi, and more preferably, the grit is blasted at a pressure from about 40 psi to 60 psi.

Once the substrate is grit blasted, the substrate is then pressure washed to remove the excess grit remaining on the substrate. A light coat of primer is then applied to the substrate to finally prepare the substrate for application of the protective coating mixture. Any suitable primer, which promotes the chemical link between the substrate and the coating, may be used. Suitable primers for priming the substrate surface are well known by those skilled in the art. Examples of suitable primers for use with this method are Chemlok FC5150 produced by the Lord Corporation and Ameribond 2000C produced by Ameribond.

In a preferred method embodiment of the present invention, the protective coating is applied to the primed substrate by use of conventional spray equipment, such that the substrate is substantially completely coated. The coating equipment used to apply the coating material to the primed substrate is of the air-assisted type utilizing a high volume low pressure (HVLP), spray apparatus. While one skilled in the art will appreciate that any conventional spraying apparatus may be used, the spraying equipment described herein by example is of the type, which measures the amount of coating material exiting the spray gun needle opening by the number of clicks the needle retainer is turned (e.g. the needle opening increases as the needle retainer is increasingly clicked from zero). The spray gun is selected such that there is minimal gun clogging and cobwebbing during the application of the coating, and such that the coating is sprayed at a deposition rate of from about 0.3 mils per pass to 2.5 mils per pass; preferably the spray gun selected for application of the coating has a deposition rate of from about 0.5 mils per pass to 2.0 mils per pass; most preferably, the deposition rate is from about 0.5 mils per pass to 1.5 mils per pass. In addition, the spray gun described herein, by example, includes a spray gun needle with a needle opening sufficient for allowing the coating material to exit the spray gun and be directed onto the substrate, a spray gun needle retainer capable of controlling the quantity of coating material exiting the spray gun needle opening, and a standard pressure pot, such that the spray gun is fed from the pressure pot using at least one in-line filter, such as a 100-micron in-line filter. A suitable spray gun for application of the coating material is a high volume low pressure (HVLP) spray gun, such as, the Turbospray 300 produced by Turbospray with a 15" to 20" gun extension The coating material is spread on the substrate using a spray gun configured to utilize the coating material and deliver it to the close quarter substrate surfaces, wherein the spray gun configuration is dictated by the gas turbine engine part geometry. The size of the spray gun needle used with the spray gun is of a suitable size to spread the coating material onto the substrate. A typical example of a suitable spray gun needle size is from about 0.026 inches to 0.36 inches. In a preferred embodiment, the needle size is from about 0.28 inches to 0.35 inches. Moreover, the spray gun needle opening is selected such that the coating material is substantially completely spread over the substrate surface. By substantially completely, what is meant is that the coating material completely covers an ample portion of the substrate such that the coating largely obscures the substrate surface. In a typical example, the coating material coats the substrate at a thickness of from about 0.010 inches (+/−0.003 inches); preferably, the coating coats the substrate from about 0.015 inches (+/−0.003 inches); most preferably, the coating coats the substrate from about 0.020 inches (+/−0.003 inches). Moreover, in a typical example of a suitable spray gun needle opening, the spray gun needle opening is from about 0 clicks to 12 clicks; preferably, the needle opening is from 2 clicks to 10 clicks; and, more preferably, the spray gun needle opening is from 4 clicks to 8 clicks. The horn/tip pressure of the spray gun is from about 2 psi to 15 psi; preferably, the horn/tip pressure is from about 3 psi to 12 psi; and more preferably, the horn/tip pressure is from about 4 psi to 10 psi. The pressure measured in the standard pressure pot is of a suitable pressure to enable the coating material to be spread onto the substrate to be coated. The pressure measured in the standard pressure pot from which the coating material is fed to the spray gun is from about 10 psi to 30 psi, and more particularly, from 15 psi to 25 psi. In applying the coating to the substrate, the spray gun is held at a suitable distance to allow the coating to be spread onto the substrate surface. Preferably, the spray gun needle is held from a distance of about 0.5 inch to 6.0 inches. In one embodiment, the spray gun is held from a distance of about 1.0 inches to 4.0 inches.

One skilled in the art will also appreciate that the spraying apparatus may be controlled by robotic means. The robotic means may be of any conventional kind, such as, for example, the Fanuc P155 six axis robot with RH control logic manufactured by Fanuc Robotics. In addition, while application of the protective coating is illustrated by spraying means, herein, it is understood by those skilled in the art that the coating may be applied by hand.

After the protective coating is applied to the substrate, the coated substrate is first air cured and then post cured, wherein the process of air curing is done conventionally and is well known to those skilled in the art. The post curing thermal cycle is done such that the substrate temperature is gradually elevated from about room temperature up to about 400 degrees Fahrenheit (F). The rate at which the temperature is raised is from about 100 degrees Fahrenheit per hour to 140 degrees Fahrenheit per hour. More preferably, the rate at which the temperature is raised is from about 110 degrees Fahrenheit per hour to 130 degrees Fahrenheit per hour. At every increment of about 50 degrees Fahrenheit, starting at from about 150 degrees Fahrenheit, the substrate is soaked for up to about one hour to flash off entrained water. By soaking, what is meant is that the substrate is allowed to remain at the given temperature for the specified time before the temperature is elevated. Once the temperature of the substrate reaches about 400 degrees Fahrenheit, the substrate is soaked for up to about five hours to fully cure the material. The coating is cured such that it has a dielectric constant from about 2.0 to 4.2 at 10 gigahertz (Ghz); preferably the dielectric constant of the cured coating is from about 2.3 to 4.0 at 10 Ghz; and most preferably the dielectric constant of the cured coating is from about 2.6 to 3.8 at 10 Ghz. In a preferred embodiment of the invention, the resulting cured material has a rain erosion resistance of 25 minutes to 50 minutes until coating penetration when tested at a specimen speed of 450 mph +/−5 mph and a simulated rain fall of 1.0 inches +/−0.01 inches per hour. More preferably, the cured material has a rain erosion resistance of 30 minutes to 55 minutes until coating penetration when tested at a specimen speed of 450 mph +/−5 mph and a simulated rain fall of 1.0 inches +/−0.01 inches per hour. Most preferably, the cured material has a rain erosion resistance of 35 minutes to 60 minutes until coating penetration when tested at a specimen speed of 450 mph +/−5 mph and a simulated rain fall of 1.0 inches +/−0.01 inches per hour.

The following is a illustrative example of the erosion coating and method of application according to the present invention which can be used to protect a composite (PMR-15) front frame structure at the inlet of a gas turbine engine.

EXAMPLE 1

| Parameter | Value |
| --- | --- |
| Spray Gun Specifications | |
| Gun Needle Size | 0.032" |
| Needle Opening | 6 clicks |
| Horn/Tip Pressure | 5 psi |
| Pot Pressure | 20 psi |
| Stand Off Distance | 1.5" |
| Erosion Material Characteristics: | |
| Coating Viscosity | 90 cp |
| Titanium Dioxide to Fluorolatex ratio | 8 TiO2 parts per 100 parts Fluorolatex |
| Dielectric Constant of Cured Coating @ 10 Ghz | 2.85 |
| Water Borne Latex Solid Content | 67% by weight |
| Rain Erosion Resistance (time until penetration) | 35 minutes |
| Grit Blast Parameters: | |
| Grit Blast Pressure | 50 psi |
| Grit Blast Stand Off Distance | 9" |
| Grit Size | 80 grit |
| Impingement Angle | 70 degrees |
| Primer: | |
| Primer Used | Chemlok FC5150 |
| Application Method | Hand wipe, thin coat |
| Post Cure Thermal Cycle: | |
| Post Cure Thermal Cycle | Total cycle is from room temperature to 400 degrees Fahrenheit (F.). At 150 degrees F., soak substrate For one hour to flash off entrained water. At 200 degrees F., soak substrate for one hour. At 250 degrees F., soak substrate for one hour. At 300 degrees F., soak substrate for one hour. At 350 degrees F., soak substrate for one hour. At 400 degrees F., soak substrate for five hours. |
| Rate of Increasing Temperature | 120 degrees F. per hour. |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

What is claimed is:

1. A method for applying a sprayable erosion coating to at least one of an aircraft component and an aircraft engine component, said method comprising the steps of:
   a) preparing the component for application of said coating;
   b) applying a coating composition comprising latex to said component by spraying to produce a coated component;
   c) curing said coated component by air at about room temperature to produce an air cured coated component; and
   d) post curing the air cured coated component, wherein the temperature of said air cured coated component is gradually elevated from about room temperature to about 400 degrees Fahrenheit, at a rate of from about 100 degrees Fahrenheit per hour to about 140 degrees Fahrenheit per hour.

2. A method according to claim 1, wherein the step of preparing the component comprises the steps of:
   a) grit blasting;
   b) pressure washing said component to substantially completely remove excess grit; and
   c) priming the pressure washed component.

3. A method according to claim 2, wherein said grit blasting is from an impingement angle from about 10 degrees to about 90 degrees.

4. A method according to claim 2, wherein said grit blasting comprises a grit size from about 60 grit to about 100 grit.

5. A method according to claim 2, wherein said grit blasting is from a stand off distance from about 4 inches to 12 inches.

6. A method according b claim 2, wherein said grit blasting is at a pressure from about 20 pounds to 100 pounds per square inch.

7. A method according to claim 1, comprising robotic spraying of said coating.

8. A method according to claim 1, wherein, said air cured coated aircraft component is heat soaked for one hour at temperature increments of about 50 degrees Fahrenheit, starting at about 150 degrees Fahrenheit.

9. A method according to claim 1, wherein said air cured coated component is heat soaked for up to about 5 hours at 400 degrees Fahrenheit.

\* \* \* \* \*